United States Patent
Jung et al.

(10) Patent No.: US 11,315,083 B2
(45) Date of Patent: Apr. 26, 2022

(54) ASSET MANAGEMENT METHOD FOR SUBSTATION

(71) Applicant: Hyosung Heavy Industries Corporation, Seoul (KR)

(72) Inventors: Jae Ryong Jung, Gimhae-si (KR); Eun Tae Lyu, Changwon-si (KR)

(73) Assignee: Hyosung Heavy Industries Corporation, Seoul (KR)

( * ) Notice: Subject to any disclaimer, the term of this patent is extended or adjusted under 35 U.S.C. 154(b) by 430 days.

(21) Appl. No.: 16/473,060

(22) PCT Filed: Dec. 15, 2017

(86) PCT No.: PCT/KR2017/014868
§ 371 (c)(1),
(2) Date: Jun. 24, 2019

(87) PCT Pub. No.: WO2018/124570
PCT Pub. Date: Jul. 5, 2018

(65) Prior Publication Data
US 2020/0097922 A1    Mar. 26, 2020

(30) Foreign Application Priority Data
Dec. 28, 2016 (KR) .................. 10-2016-0181583

(51) Int. Cl.
*G05B 23/02* (2006.01)
*G06Q 10/00* (2012.01)
*G06N 5/02* (2006.01)
*G06Q 10/06* (2012.01)

(52) U.S. Cl.
CPC ......... *G06Q 10/20* (2013.01); *G05B 23/0283* (2013.01); *G06N 5/02* (2013.01); *G06Q 10/0635* (2013.01); *G06Q 10/063116* (2013.01)

(58) Field of Classification Search
CPC .......... G06Q 10/20; G06Q 10/063116; G06Q 10/0635; G06Q 10/04; G06Q 10/06; G06Q 30/02; G06Q 50/10; G06Q 10/043; G06Q 10/0637; G06Q 30/0283; G06Q 50/06; G05B 23/0283; G05B 23/02; G06N 5/02;
(Continued)

(56) References Cited

U.S. PATENT DOCUMENTS

2012/0239320 A1* 9/2012 Frei ..................... H04L 41/5012
702/58

FOREIGN PATENT DOCUMENTS

| CN | 202931037 U | * | 5/2013 | ............. Y04S 10/16 |
| CN | 103154845 A | * | 6/2013 | ............. G16Z 99/00 |
| CN | 103633739 A | * | 3/2014 | |

(Continued)

OTHER PUBLICATIONS

US 20120239320 A1, Compressed version of the PGPUb, Sep. 2012.*

*Primary Examiner* — Kandasamy Thangavelu
(74) *Attorney, Agent, or Firm* — Novick, Kim & Lee, PLLC; Jae Youn Kim

(57) ABSTRACT

An asset management method for a substation includes deriving an optimal management plan by each element of the substation depending on integrity of the each element of the substation and deriving an optimal unique reliability model for each element of the substation through a process of compensating a reference reliability model of each substation type and an apparatus executing the method.

9 Claims, 4 Drawing Sheets

(58) Field of Classification Search
CPC ......... G06N 5/003; Y04S 10/50; Y04S 10/06; G16Z 99/00; H04L 41/145
See application file for complete search history.

(56) References Cited

FOREIGN PATENT DOCUMENTS

| | | | | |
|---|---|---|---|---|
| CN | 104504246 A | * | 4/2015 | |
| CN | 104715294 A | * | 6/2015 | ............. G06Q 10/04 |
| CN | 105023104 A | * | 11/2015 | ............. Y04S 10/50 |
| CN | 105471656 A | * | 4/2016 | ............. H04L 41/145 |
| CN | 105809322 A | * | 7/2016 | ............. G06Q 50/06 |
| JP | 2002-297709 A | | 10/2002 | |
| JP | 4991627 B2 | | 8/2012 | |
| KR | 10-2011-0034508 A | | 4/2011 | |
| KR | 10-2016-0092527 A | | 8/2016 | |
| KR | 10-2016-0093119 A | | 8/2016 | |

* cited by examiner

ASSET MANAGEMENT METHOD FOR SUBSTATION

FIELD OF THE INVENTION

The present invention relates to an asset management method for a substation; and more particularly to, the asset management method for the substation of deriving an optimal management plan by each element of the substation depending on integrity of the each element of the substation.

BACKGROUND OF THE INVENTION

Among power systems, a transmission system or a distribution system has a substation to raise or reduce output of a generator or voltage of the system. In addition to a transformer for raising or reducing voltage, the substation includes devices or systems for centralizing or distributing power, those for controlling tidal current, or those for protecting and controlling its devices.

For example, in a gas circuit breaker used for a gas insulated switchgear or GIS, a gas pressure sensor for detecting gas pressure change, current and voltage detectors, etc. are installed while a transformer has a thermometer, a pressure gauge, a liquid measuring sensor, a current detector, etc. as sensors for detecting its state.

Those sensors are connected to a protective system, a measuring system, a controller, and a devices-monitoring system through cables which transmit electronic signals. Again, the protective system, the measuring system, the controller, and the devices-monitoring system are connected to a superior substation-monitoring controller through cables which transmit the electronic signals.

The substation has very complicated equipment to stably supply electricity which monitors operational state of a variety of devices such as a circuit breaker installed in the substation and also provides a monitoring system to detect a failure symptom in advance to prevent such failure or recover in rapid response to any incurred failure.

As it is difficult to identify accurate states of elements of the substation, the need for optimized techniques for asset management such as an element replacement cycle, and a maintenance plan is raised and a plan for solving such requirements is needed.

DETAILED EXPLANATION OF THE INVENTION

Objects of the Invention

An object of the present invention is to provide an asset management method for a substation to derive an optimal unique reliability model for each element of the substation through a process of compensating a reference reliability model of each substation type and an apparatus executing the method.

The other object of the present invention is to provide an asset management method for a substation to satisfy clients' requested needs of element replacement cycles, maintenance plans, and asset management techniques and an apparatus executing the method.

The objects of the present invention are not limited to the aforementioned objects and other objects which have not been mentioned could be clearly understood by those skilled in the art from description below.

Means of Solving the Problem

An asset management method for a substation in accordance with the present invention comprises steps of: determining whether to compensate a reliability model for each element of a substation by comparing reliability from a reference reliability model for each substation type with integrity of the each element thereof generated based on state data and real-time monitoring data of the each element of the substation; compensating the reference reliability model for each substation type and generating a unique reliability model for the each element of the substation by using the integrity of the each element of the substation depending on the result of the determination; assessing system reliability index and economic feasibility for each maintenance scenario based on a pre-generated reference system reliability model for each candidate element subject to maintenance among the elements of the substation; executing maintenance after selecting a maintenance scenario for the each candidate element subject to maintenance based on the integrity of the each element of the substation, the unique reliability model for the each element of the substation, and the results of the system reliability index and the economic feasibility; and updating the unique reliability model for the each element of the substation as a result of the maintenance executed.

Herein, it is desirable to generate a reference reliability model for the each substation type based on at least one of data on installation and checkup history, data on analysis of obsolete and removed items, and data on accelerated life tests for the each element of the substation.

In addition, the step of generating the integrity of the each element of the substation by using the state data and the real-time monitoring data of the each element of the substation may include a step of generating the integrity of the each element of the substation by utilizing online, offline, and remote monitoring state data of the each element of the substation, wherein the offline monitoring state data may include at least one of data on installation history, checkup history, failure history, operating environment, and operating history of the each element of the substation.

Besides, the step of generating the integrity of the each element of the substation by using the state data and the real time monitoring data may include a step of generating total score of, and actions against, technical risks depending on an operating environment, insulation deterioration, an electrical risk, a thermal risk, a chemical risk, a mechanical risk, airtightness performance, insulation performance, interrupting performance, and current-carrying performance of the each element of the substation.

Moreover, the step of compensating the reference reliability model for each substation type and generating a unique reliability model for the each element of the substation by using the integrity of the each element of the substation depending on the result of the determination may include a step of compensating the reference reliability model for the each substation type and generating the unique reliability model for the each element of the substation by applying the integrity of the each element of the substation to the reference reliability model for the each substation type if the reliability of the reference reliability model for the each substation type and the integrity of the each element of the substation are different from each other.

Meanwhile, the step of assessing system reliability index and economic feasibility for each maintenance scenario based on a pre-generated reference system reliability model for each candidate element subject to maintenance among the elements of the substation may further include a step of assessing power outage costs, value of lost load, sensitivity of element, current value, and future value by applying failure rate, failure recovery time, load of loading point, repair costs, recovery costs, target maintenance costs, interest rate, equipment sensitivity, and parent-child relationships between the elements of the substation to the reference system reliability model.

Furthermore, the step of executing maintenance after selecting a maintenance scenario for the each candidate element subject to maintenance based on the integrity of the each element of the substation, the unique reliability model for the each element of the substation, and the results of the system reliability index and the economic feasibility may include a step of deriving, and calculating an estimate of, a maintenance scenario for each candidate element subject to maintenance including a maintenance strategy method, costs, and priority for each element of the substation, checkup cycle, estimated costs, checkup scheduling, and assumed maintenance effects for each element thereof, and expected replacement time for each element thereof depending on an output value of assessing reliability, an output value of technical assessment, and an output value of economic feasibility for the maintenance scenario.

Besides, at the step of updating the unique reliability model for the each element of the substation as a result of the maintenance executed, it is possible to update the unique reliability model for the each element of the substation by applying improvement effects as a result of executing the maintenance.

Furthermore, the step of assessing system reliability index and economic feasibility for each maintenance scenario based on a pre-generated reference system reliability model for each candidate element subject to maintenance among the elements of the substation may include a step of selecting a candidate element subject to maintenance from among the elements of the substation depending on predetermined priorities.

Effects of the Invention

The present invention has an advantage of deriving an optimal unique reliability model for each element of a substation through a process of compensating a reference reliability model of each substation type.

In addition, the present invention has an advantage of satisfying clients' requested needs of equipment replacement cycles, maintenance plans and asset management techniques.

DETAILED DESCRIPTION OF THE PREFERRED EMBODIMENTS

Detailed example embodiments to implement the present invention will be explained below by referring to attached drawings.

Advantages and/or characteristics of the present invention and a method for achieving them will be clarified by referring to example embodiments described in details with attached drawings. However, the present invention will not be limited to example embodiments below but will be implemented in a variety of forms. The example embodiments herein will complete the commencement of the present invention and will be provided to completely inform those skilled in the art of the scope of the present invention in the technical field to which the present invention belongs and the present invention is just defined by the scope of claims. Same reference signs indicate same components over the whole specification.

Figure 1:
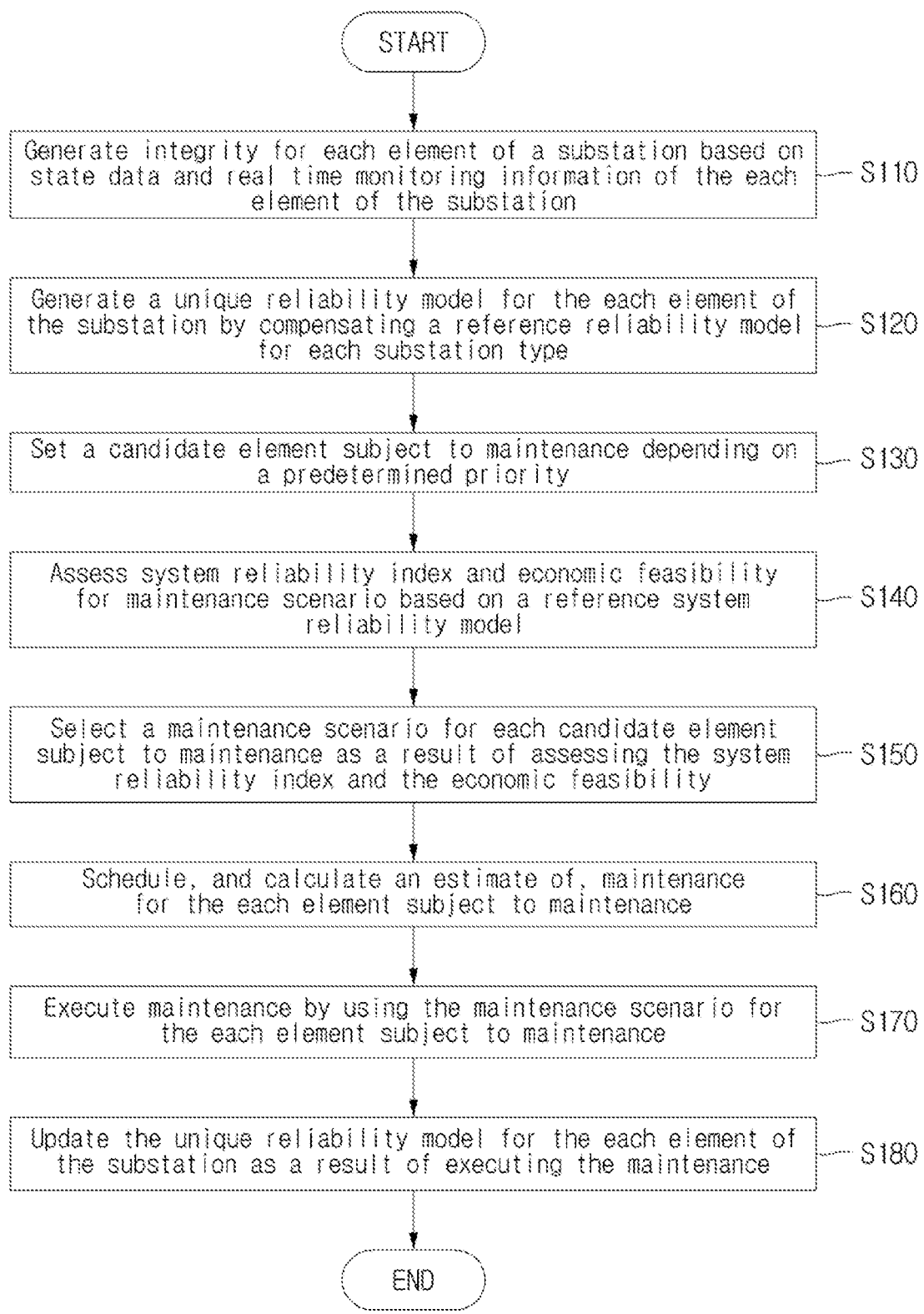
FIG. 1 is a flowchart to explain an asset management process for a substation in accordance with one example embodiment of the present invention.

FIG. 1 is a flowchart to explain an asset management process for a substation in accordance with one example embodiment of the present invention.

By referring to FIG. 1, an asset management apparatus 100 for a substation generates integrity for each element of the substation based on state data and real time monitoring data of each element of the substation at S110. At the time, the state data and the real time monitoring data of each element of the substation include online, offline, and remote monitoring state data of each element of the substation. The offline monitoring state data may include at least one of data on installation history, checkup history, failure history, operating environment and operating history for each element of the substation.

In one example embodiment of the present invention at S110, the asset management apparatus 100 for the substation may generate total score of, and actions against, technical risks depending on an operating environment, insulation deterioration, an electrical risk, a thermal risk, a chemical risk, a mechanical risk, airtightness performance, insulation performance, interrupting performance, and current-carrying performance of the each element of the substation.

For example, the asset management apparatus 100 for the substation may generate total score of, and actions against, technical risks depending on an operating environment, insulation deterioration, an electrical risk, a thermal risk, a chemical risk, and a mechanical risk of a transformer, TR, by using information on a reference reliability model of the TR.

For another example, the asset management apparatus 100 for the substation may generate total score of, and actions against, technical risks depending on operating history data, airtightness performance, insulation performance, interrupting performance, and current-carrying performance of a gas insulated switchgear or GIS by using a reference reliability model of the GIS.

Next, the asset management apparatus 100 for the substation determines whether to compensate a reference reliability model for each substation type based on the reference reliability model for the each substation type and integrity of the each element of the substation. Herein, a reference reliability model for each substation type is a reference reliability model for each substation type generated based on data on installation and checkup history, data on analysis of obsolete and removed items, and data on accelerated life tests for the each element of the substation.

At the time, if the integrity of the each element of the substation and the reliability of the reference reliability model for the each substation type are identical to each other, the asset management apparatus 100 for the substation does not compensate the reference reliability model for the each substation type by determining that the currently used reference reliability model for the each substation type is an optimal reference reliability model.

In addition, if the integrity of the each element of the substation and the reliability of the reference reliability model for the each substation type are different from each other, the asset management apparatus 100 for the substation generates a unique reliability model for the each element of the substation by compensating the reference reliability model for the each substation type at S120.

In short, if the integrity of each element of the substation and the reliability of the reference reliability model for the each substation type are different from each other, the asset management apparatus 100 for the substation determines that the currently used reference reliability model for the each substation type is not an optimal reference reliability model and compensates the reference reliability model for the each substation type by using the integrity of each element of the substation, and generates a unique reliability model for the each element of the substation.

As shown above, through a process of compensating the reference reliability model for the each substation type, an optimal reference reliability model for the each element of the substation may be derived.

After that, the asset management apparatus 100 for the substation sets each candidate element subject to maintenance depending on a predetermined priority at S130. For example, if the predetermined priority of the asset management apparatus 100 for the substation is failure rate, it is possible to set candidate elements with high failure rates subject to maintenance depending on the predetermined priority. In addition, other priorities may be applied under different situations.

Since then, the asset management apparatus 100 for the substation assesses system reliability index and economic feasibility for each maintenance scenario based on a pre-generated reference system reliability model for the each candidate element subject to maintenance among the elements of the substation at S140.

In accordance with one example embodiment regarding S140, the asset management apparatus 100 for the substation assesses power outage costs, value of lost load, sensitivity of element, current value, and future value by applying, to the pre-generated reference system reliability model, failure rate, failure recovery time, load of loading point, repair costs, recovery costs, target maintenance costs, interest rate, equipment sensitivity, and parent-child relationships between the elements of the substation.

Besides, the asset management apparatus 100 for the substation selects a maintenance scenario for the each candidate element subject to maintenance as the result of the system reliability index and the economic at S150.

In accordance with one example embodiment of S150, the asset management apparatus 100 for the substation derives and selects a maintenance scenario including a maintenance strategy method, costs, and priority for each element of the substation, checkup cycle, estimated costs, checkup scheduling, and assumed maintenance effects for each element thereof, and expected replacement time for each element thereof depending on an output value for assessing reliability, an output value for technical assessment, and an output value for economic feasibility of each candidate element subject to maintenance.

In another example embodiment of S150, the asset management apparatus 100 for the substation generates a maintenance scenario from an aspect of costs, a maintenance scenario from an aspect of reliability, optimal checkup, and a replacement plan according to information on a first result generated by combining the integrity of the each element of the substation and the reference reliability model for the each substation type, a second result generated by combining the integrity, system reliability index, and economic feasibility for each element of the substation and a third result by combining the information on the second result and a maintenance plan.

Next, the asset management apparatus 100 for the substation schedules and calculates an estimate of maintenance for each candidate element subject to maintenance at S160.

After the maintenance is executed by using the maintenance scenario for the each candidate element subject to maintenance at S170, the asset management apparatus 100 for the substation updates the unique reliability model for the each element of the substation as the result of executing the maintenance at S180.

Figure 2:
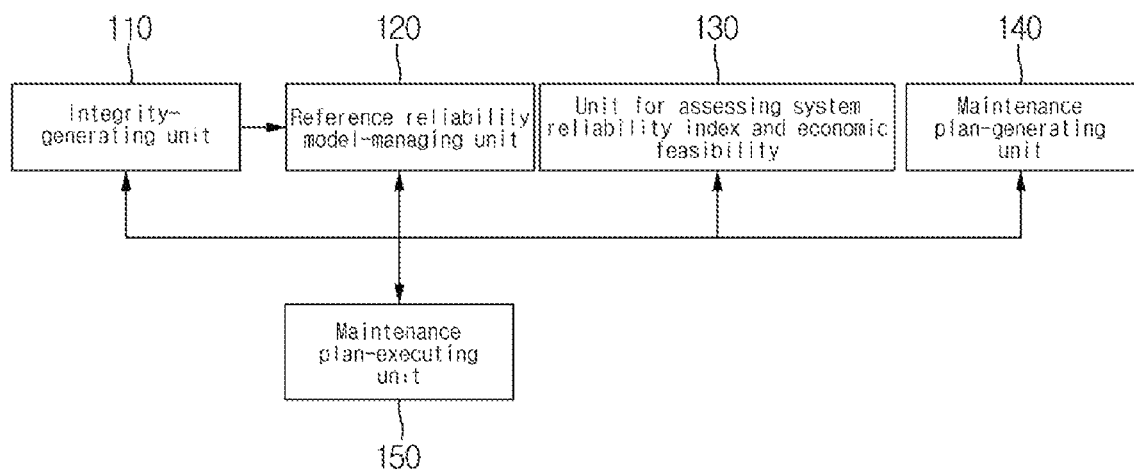
FIG. 2 is a block diagram to explain an internal structure of the asset management apparatus for the substation in accordance with one example embodiment of the present invention.

FIG. 2 is a block diagram to explain an internal structure of the asset management apparatus for the substation in accordance with one example embodiment of the present invention.

By referring to FIG. 2, the asset management apparatus 100 for the substation includes integrity-generating unit 110, a reference reliability model-managing unit 120, a unit 130 for assessing system reliability index and economic feasibility, a maintenance plan-generating unit 140, and a maintenance plan-executing unit 150.

The integrity-generating unit 110 generates integrity for each element of the substation by using the state data and the real time monitoring data of the each element of the substation. At the time, the state data and the real time monitoring data of the each element of the substation includes online, offline, and remote monitoring state data of the each element of the substation. The offline monitoring state data may include at least one of data on installation history, checkup history, failure history, operating environment, and operating history of the each element of the substation.

In accordance with one example embodiment of the present invention, the integrity-generating unit 110 may generate total score of, and actions against, technical risks depending on an operating environment, insulation deterioration, an electrical risk, a thermal risk, a chemical risk and a mechanical risk, airtightness performance, insulation performance, interrupting performance, and current-carrying performance of the each element of the substation based on the state data and the real time monitoring data of the each element of the substation.

For example, the integrity-generating unit 110 may generate total score of, and actions against, technical risks depending on an operating environment, insulation deterioration, an electrical risk, a thermal risk, a chemical risk, and a mechanical risk of a transformer, TR, by using information on a reference reliability model of the TR.

For another example, the integrity-generating unit 110 may generate total score of, and actions against, technical risks depending on operating history data, airtightness performance, insulation performance, interrupting performance, and current-carrying performance of a gas insulated switchgear or GIS by using a reference reliability model of the GIS.

The reference reliability model-managing unit 120 determines whether to compensate a reference reliability model for each substation type based on the reference reliability model for the each substation type and integrity of the each element of the substation. Herein, a reference reliability model for each substation type is a reference reliability model for a substation type generated based on data on installation and checkup history, data on analysis of obsolete and removed items, and data on accelerated life tests for the each element.

At the time, if the integrity of each element of the substation is identical to the reliability of the reference reliability model for the each substation type, the reference reliability model-managing unit 120 does not compensate the reference reliability model for the each substation type by determining that the currently used reference reliability model for the each substation type is an optimal reference reliability model.

In addition, if the integrity of each element of the substation is different from the reliability of the reference reliability model for the each substation type, the reference reliability model-managing unit 120 generates a unique reliability model for each element of the substation by compensating the reference reliability model for the each substation type.

In short, if the integrity of each element of the substation is different from the reliability of the reference reliability model for the each substation type, the reference reliability model-managing unit 120 determines that the currently used reference reliability model for the each substation type is not an optimal reference reliability model and uses the integrity of each element of the substation and then compensates the reference reliability model for the each substation type, thereby generating a unique reliability model for each element of the substation.

As seen above, the present invention may optimize a unique reliability model for each element of a substation by compensating a reference reliability model for each substation type depending on the integrity of each element of the substation, instead of continuously using the reference reliability model for the each substation type.

After setting each candidate element subject to maintenance among the elements of the substation depending on a predetermined priority, the unit 130 for assessing system reliability index and economic feasibility assesses system reliability index and economic feasibility for each maintenance scenario based on a pre-generated reference system reliability model for each candidate element subject to maintenance.

After applying failure rate, failure recovery time, load of loading point, repair costs, recovery costs, target maintenance costs, interest rate, equipment sensitivity, and parent-child relationships between the elements of the substation to the pre-generated reference system reliability model, the unit 130 for assessing system reliability index and economic feasibility in accordance with one example embodiment of the present invention assesses system reliability index and economic feasibility for each maintenance scenario by generating power outage costs, value of lost load, sensitivity of element, i.e., from an economic aspect and an aspect of reliability, a result of analysis of economic feasibility, i.e., current value, and future value.

The maintenance plan-generating unit 140 selects a maintenance scenario for the each candidate element subject to maintenance as the result of the integrity for the each element of the substation, the reference reliability model for the each substation type, the system reliability index, and the economic feasibility.

In accordance with one example embodiment of the present invention, the maintenance plan-generating unit 140 derives and selects a maintenance scenario for candidate element subject to maintenance, including a maintenance strategy method, costs, and priority for each element of the substation, checkup cycle, estimated costs, checkup scheduling, and assumed maintenance effects for each element thereof, and expected replacement time for each element thereof depending on an output value for assessing reliability, an output value for technical assessment, and an output value for economic feasibility of maintenance scenario.

In accordance with another example embodiment of the present invention, the maintenance plan-generating unit 140 generates a maintenance scenario from an aspect of costs, a maintenance scenario from an aspect of reliability, optimal checkup, and a replacement plan according to information on a first result generated by combining the integrity generated by the integrity-generating unit 110 and the reference reliability model generated by the reference reliability model-managing unit 120, a second result generated by combining the integrity generated by the integrity-generating unit 110 and the system reliability index, and economic feasibility generated by the unit 130 for assessing system reliability index and economic feasibility and a third result by combining the information on the second result and a maintenance plan generated by the maintenance plan-generating unit 140.

The maintenance plan-executing unit 150 updates the unique reliability model for each element of the substation as the result of executing the maintenance under the maintenance scenario for candidate element subject to maintenance selected by the maintenance plan-generating unit 140.

Figure 3:
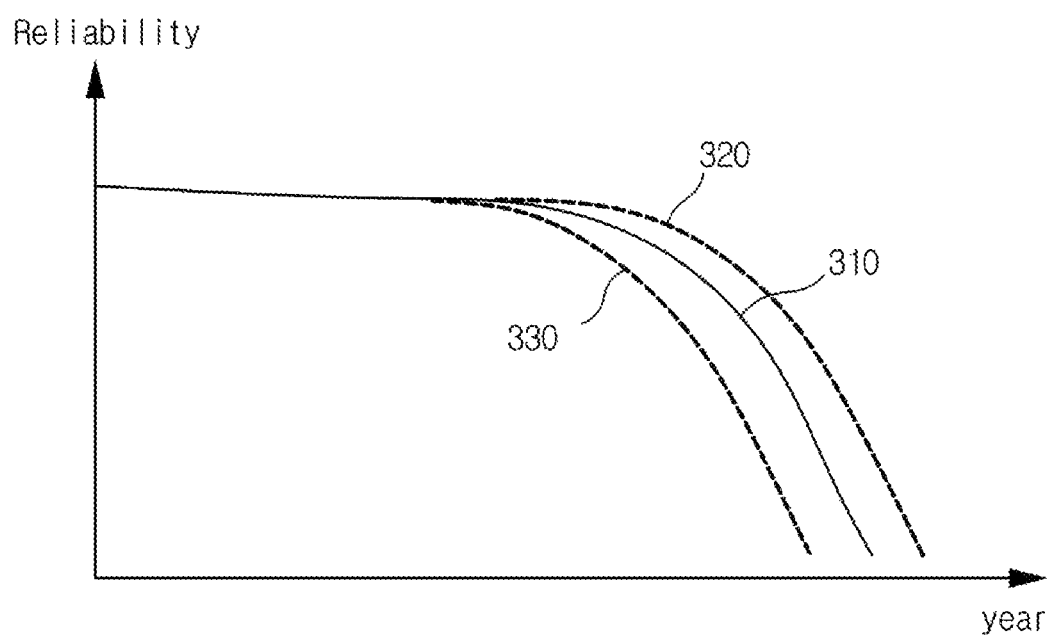
FIG. 3 is a graph to explain a process of determining whether to compensate a reference reliability model for each substation type in accordance with one example embodiment of the present invention.

FIG. 3 is a graph to explain a process of determining whether to compensate a reference reliability model for each substation type in accordance with one example embodiment of the present invention.

By referring to FIG. 3, the asset management apparatus 100 for the substation determines whether to compensate a reference reliability model for each substation type by comparing reliability 310 of the reference reliability model for the each substation type with reliability 320, 330 depending on the generated integrity for the each element of the substation based on the state data and the real time monitoring data of the each element of the substation. As explained above, the reference reliability model for the each substation type is the generated reference reliability model for the each substation type based on data on installation and checkup history, data on analysis of obsolete and removed items, and data on accelerated life tests for the each element of the substation.

Herein, a drawing reference number 320 represents that the reliability depending on the integrity of the each element of the substation is higher than the reliability 310 of the reference reliability model for the each substation type and a drawing reference number 330 represents that the reliability depending on the integrity of the each element of the substation is lower than the reliability 310 of the reference reliability model for the each substation type.

In accordance with one example embodiment of the present invention, if the reliability 310 of the reference reliability model for the each substation type is different from the reliability 320, 330 of the generated integrity for the each element of the substation based on the state data and the real time monitoring data of the each element of the substation, the asset management apparatus 100 for the substation calculates a unique reliability model for each element of the substation by compensating the reference reliability model for the each substation type.

In other words, if the reliability 320, 330 depending on the integrity of the each element of the substation is different from the reliability 310 of the reference reliability model for the each substation type, the asset management apparatus 100 for the substation determines that the currently used reference reliability model for the each substation type is not an optimal reference reliability model and compensates the reference reliability model for the each substation type depending on the integrity of the each element of the substation, thereby calculating the unique reliability model for the each element of the substation.

Meanwhile, if the reliability depending on the generated integrity for the each element of the substation based on the state data and the real time monitoring data of the each element of the substation overlaps with the reliability 310 of the reference reliability model for the each substation type, the asset management apparatus 100 for the substation does not compensate the reference reliability model for the each substation type by determining that the currently used reference reliability model for the each substation type is optimal.

The present invention may derive an optimal unique reliability model for each element of a substation through a process of compensating a reference reliability model for each substation type as shown above.

Figure 4:
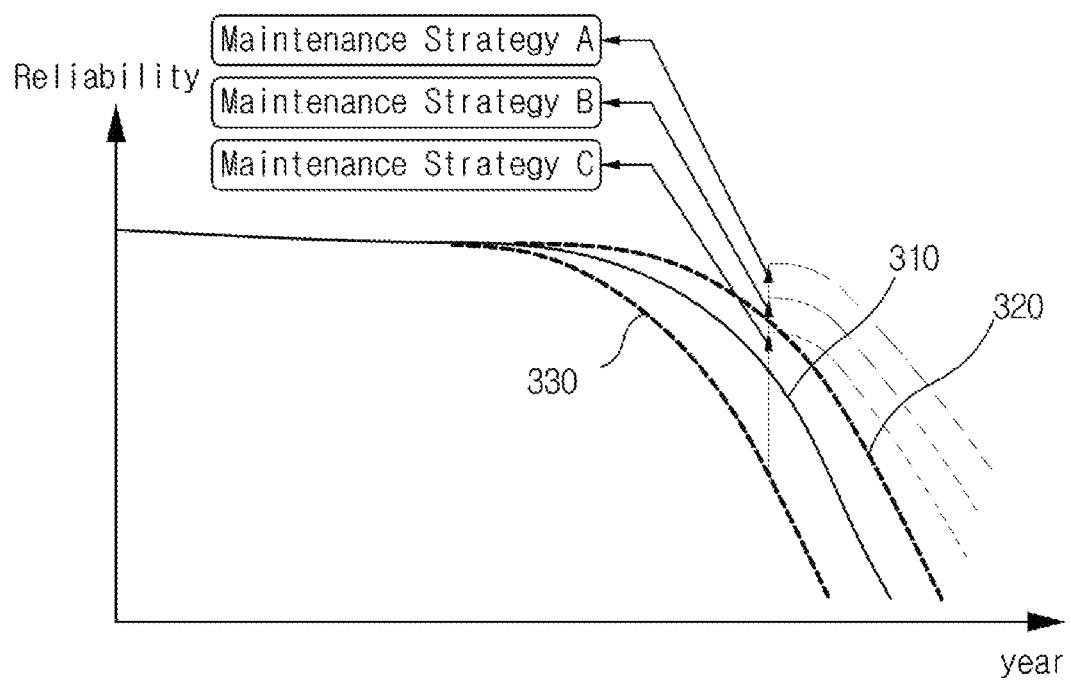
FIG. 4 is a graph to explain reliability change of each maintenance scenario for the each element of the substation in accordance with one example embodiment of the present invention.

FIG. 4 is a graph to explain reliability change of each maintenance scenario for the each element of the substation in accordance with one example embodiment of the present invention.

In accordance with one example embodiment of the present invention, a basis of improving reliability of a maintenance method may be set differently and for a maintenance method, it is possible to set 100% for replacement of a device, 30% for precise inspection, and 15% for normal inspection but depending on history of actual maintenance carried out, the reliability may be differently set according to the maintenance under precise inspection and normal inspection.

In FIG. 4, it can be found that a maintenance strategy A as a maintenance scenario including the replacement of the device has the most greatly improved reliability while a maintenance strategy B as a precise inspection-centered maintenance scenario has the moderately improved reliability.

Meanwhile, it can be found that a maintenance strategy C as a maintenance scenario to which normal inspection is applied shows the least greatly improved reliability.

As shown above, the present invention has been explained by limited example embodiments and drawings but it is not limited to the example embodiments. Various changes and modifications may be derived from those skilled in the art. Accordingly, the invention must be identified by the claims of the present invention as described below and all variables and equivalents would appertain to the scope of the ideas of the present invention.

REFERENCE NUMERALS

100: Asset management apparatus for a substation
110: Integrity-generating unit
120: Reference reliability model-managing unit
130: Unit for assessing system reliability index and economic feasibility
140: Maintenance plan-generating unit
150: Maintenance plan-executing unit

INDUSTRIAL AVAILABILITY

The present invention relates to an asset management method for a substation and is available in a field of power equipment.

What is claimed is:

1. An asset management method for a substation, comprising:

determining whether to compensate a reliability model for each element of the substation by comparing reliability from a reference reliability model for each substation type with integrity of the each element thereof generated based on state data and real-time monitoring data of the each element of the substation;

compensating the reference reliability model for the each substation type and generating a unique reliability model for the each element of the substation by using the integrity of the each element of the substation as a result of the determination;

assessing a system reliability index and an economic feasibility for each maintenance scenario based on a pre-generated reference system reliability model for each candidate element subject to maintenance among the elements of the substation;

executing maintenance after selecting a maintenance scenario for the each candidate element subject to maintenance based on the integrity of the each element of the substation, the unique reliability model for the each element of the substation, and results of assessing the system reliability index and the economic feasibility; and updating the unique reliability model for the each element of the substation as a result of executing the maintenance.

2. The method of claim 1, wherein the reference reliability model for the each substation type is generated based on at least one of data on installation and checkup history, data on analysis of obsolete and removed items, and data on accelerated life tests for the each element of the substation.

3. The method of claim 1, wherein the integrity is generated by utilizing online, offline, and remote monitoring state data of the each element of the substation, and wherein the offline monitoring state data include at least one of data on installation history, checkup history, failure history, operating environment, and operating history of the each element of the substation.

4. The method of claim 1, wherein the integrity is generated by generating a total score of, and actions against, technical risks depending on operating environment, an insulation deterioration, an electrical risk, a thermal risk, a chemical risk, a mechanical risk, an airtightness performance, an insulation performance, an interrupting performance, and a current-carrying performance of the each element of the substation.

5. The method of claim 1, wherein the compensating of the reference reliability model and the generating of the unique reliability model include applying the integrity of the each element of the substation to the reference reliability model for each substation type if the reliability of the reference reliability model for the each substation type is different from the integrity of the each element of the substation.

6. The method of claim 1, wherein the assessing of the system reliability index and the economic feasibility includes assessing power outage costs, a value of lost load, sensitivity of the each element, a current value, and a future value by applying a failure rate, a failure recovery time, a load of a loading point, repair costs, recovery costs, target maintenance costs, an interest rate, equipment sensitivity, and parent-child relationships between the elements of the substation to the pre-generated reference system reliability model for the each candidate element subject to maintenance.

7. The method of claim 1, wherein the executing of the maintenance includes deriving, and calculating estimates of various parameters of the maintenance scenario for each candidate element subject to maintenance including a maintenance strategy method, costs, and priority for each element of the substation, a checkup cycle, estimated costs, checkup scheduling, and assumed maintenance effects for each element thereof, and an expected replacement time for each element thereof depending on an output value of the system reliability index, an output value of technical assessment of the state data of the each element of the substation, and an output value of the economic feasibility for the each maintenance scenario.

8. The method of claim 7, wherein the updating of the unique reliability model includes applying improvement effects as the result of executing the maintenance.

9. The method of claim 1, wherein the assessing of the system reliability index and the economic feasibility includes selecting a candidate element subject to maintenance from among the elements of the substation depending on predetermined priorities of the candidate elements.

* * * * *